United States Patent
Wein et al.

(10) Patent No.: US 6,856,710 B2
(45) Date of Patent: Feb. 15, 2005

(54) POLARIZATION MODE DISPERSION COMPENSATION IN OPTICAL TRANSMISSION MEDIA

(75) Inventors: Steven J. Wein, Sudbury, MA (US); Arthur Menikoff, Harvard, MA (US); James D. Targove, Sudbury, MA (US)

(73) Assignee: Terapulse, Inc., Acton, MA (US)

( * ) Notice: Subject to any disclaimer, the term of this patent is extended or adjusted under 35 U.S.C. 154(b) by 0 days.

(21) Appl. No.: 10/101,427

(22) Filed: Mar. 19, 2002

(65) Prior Publication Data

US 2002/0176645 A1 Nov. 28, 2002

Related U.S. Application Data

(60) Provisional application No. 60/276,982, filed on Mar. 19, 2001.

(51) Int. Cl.⁷ ............................................ G02B 6/00
(52) U.S. Cl. ......................... 385/11; 398/147; 398/152
(58) Field of Search ......................... 385/11; 398/147, 398/152; 359/161, 156

(56) References Cited

U.S. PATENT DOCUMENTS

| | | | |
|---|---|---|---|
| 3,636,359 A | 1/1972 | Hooper | 250/217 |
| 3,700,334 A | 10/1972 | Low et al. | 356/106 |
| 3,881,823 A | 5/1975 | De Lang et al. | 356/106 |
| 5,227,623 A | 7/1993 | Heffner | |
| 5,444,532 A | 8/1995 | Sueyoshi | 356/349 |
| 5,528,369 A | 6/1996 | Starkey | 356/351 |
| 5,654,793 A | 8/1997 | Barlow et al. | |
| 5,712,704 A | 1/1998 | Martin et al. | |
| 5,734,473 A | 3/1998 | Gerhart et al. | 356/364 |
| 5,850,492 A | 12/1998 | Morasca et al. | |
| 5,852,496 A | 12/1998 | Gisin et al. | |
| 5,859,939 A | 1/1999 | Fee et al. | |
| 5,930,414 A | 7/1999 | Fishman et al. | |
| 5,949,560 A | 9/1999 | Roberts et al. | |
| 5,965,874 A | 10/1999 | Aso et al. | |
| 6,011,253 A | 1/2000 | Hakki | |
| 6,104,515 A | 8/2000 | Cao | |
| 6,130,766 A | 10/2000 | Cao | |
| 6,134,034 A | 10/2000 | Terahara | 359/124 |
| 6,144,450 A | 11/2000 | Jopson et al. | |
| 6,188,477 B1 | 2/2001 | Pu et al. | 356/351 |
| 6,204,924 B1 | 3/2001 | Cyr | |
| 6,211,957 B1 | 4/2001 | Erdogan et al. | |

(List continued on next page.)

FOREIGN PATENT DOCUMENTS

| | | | |
|---|---|---|---|
| EP | 0 909 045 A2 | 4/1999 | |
| WO | 01/42749 A1 | 6/2001 | G01J/4/00 |
| WO | 01/61385 A2 | 8/2001 | G02B/6/00 |
| WO | 01/67644 A1 | 9/2001 | H04B/10/00 |

OTHER PUBLICATIONS

International Search Authority, "International Search Report," PCT Application No. PCT/US03/07703, mailed on Sep. 24, 2003, 4 pgs.

(List continued on next page.)

Primary Examiner—Rodney Bovernick
Assistant Examiner—Sung Pak
(74) Attorney, Agent, or Firm—Testa, Hurwitz & Thibeault, LLP

(57) ABSTRACT

The present invention provides a method and apparatus for compensating for polarization mode dispersion in an optical transmission system without perturbing the laser source. The present invention compensates for PMD by transferring a sufficient fraction of the light signal in an optical transmission system substantially into a single PSP of the system. As a result, each light pulse in a data stream is not substantially mixed with temporally adjacent light pulses or bit periods.

41 Claims, 9 Drawing Sheets

U.S. PATENT DOCUMENTS

| | | | |
|---|---|---|---|
| 6,229,599 B1 | 5/2001 | Galtarossa | |
| 6,229,606 B1 | 5/2001 | Way et al. | |
| 6,327,039 B1 | 12/2001 | de Groot et al. | 356/517 |
| 6,400,479 B1 | 6/2002 | Zhou et al. | 359/134 |
| 6,421,131 B1 | 7/2002 | Miller | 356/453 |
| 6,459,487 B1 | 10/2002 | Chen et al. | 356/491 |
| 6,603,890 B2 | 8/2003 | Khosravani et al. | 385/11 |
| 2003/0021514 A1 * | 1/2003 | Ito et al. | 385/11 |

OTHER PUBLICATIONS

International Search Authority, "International Search Report," PCT Application No. PCT/US03/11133, mailed on Sep. 26, 2003, 3 pgs.

U.S. Appl. No. 10/218,681, filed Aug. 14, 2002, Wein et al.

U.S. Appl. No. 10/259,171, filed Sep. 27, 2002, Menikoff et al.

U.S. Appl. No. 60/364,958, filed Mar. 15, 2002, Wein et al.

U.S. Appl. No. 60/371,534, filed Apr. 10, 2002, Wein et al.

Keller, C.U. "Zurich Imaging Stokes Polarimeters I and II", Jul. 25, 1994, p. 222–230, Proceedings of the SPIE, SPIE, Bellingham, VA, US.

International Search Authority, "International Search Report", PCT Application No. PCT/US 02/25918, mailed on Dec. 17, 2002, pp. 1–4.

International Search Authority, "International Search Report", PCT Application No. PCT/US02/08399, mailed on Jul. 30, 2002, 6 pages.

Bock et al., "Characterization of Highly Birefringent Optical Fibers Using Interferometric Techniques," IEEE Instrumentation and Measurement Technology Conference, Brussells, Belgium (Jun. 4–6, 1996), pp. 927–932.

Bülow., "PMD Mitigation Techniques and Their Effectiveness in Installed Fiber" OFC Conference Proceedings, pp. THH101–THH103, Baltimore Maryland, Mar. 7–10, 2000.

Francia et al., "Simple Dynamic Polarisation Mode Dispersion Compensator," Eletronics Letters, vol. 35, No. 5 (Mar. 4, 1999), pp. 414–415.

Gordon et al., "PMD Fundamentals: Polarization Mode Dispersion in Optical Fibers," PNAS, vol. 97, No. 9 (Apr. 25, 2000) pp. 4541–4550.

Heisman, "Polarization Mode Dispersion: Fundamentals and Impact on Optical Communication Systems," Tutorial part of the ECOC Conference in Madrid Spain (Sep. 20–24, 1998), pp. 51–79.

Oberson et al., "Interferometric Polarization Mode Dispersion Measurements with Femtosecond Sensitivity," Wave Technology, vol. 15, No. 10 (Oct. 1997), pp. 1852–1857.

Poole et al., "Chapter 6: Polarization Effects in Lightwave Systems," *Optical Fiber Telecommunications IIIA*, editors Kaminow and Koch. Morgan Kaufmman Publishers, 1997, pp. 114–161.

Pua et al., "An Adaptive First–Order Polarization–Mode Dispersion Compensation System Aided by Polarization Scrambling: Theory and Demonstration," Journal of Lighwave Technology, vol. 18, No. 6 (Jun. 2000), pp. 832–841.

U.S. Appl. No. 09/767,919, filed Dec. 20, 2001, Chung et al.

U.S. Appl. No. 10/389,706, Wein et al.

U.S. Appl. No. 10/411,871, Wein et al.

U.S. Appl. No. 10/207,357, filed Jan. 30, 2002, Ito et al.

International Search Authority, "International Search Report," PCT Application No. PCT/US02/30711, mailed on May 8, 2003, pp. 1–3.

Mader, W., "Management of Optical Networks, Final Report," pp. 1–49, Feb. 26, 1999.

Agrawal, G.P., "Fiber–Optic Communication Systems," 2nd Ed., pp. 365–366, Aug. 1997.

Lee et al., "OSNR monitoring techique using polarization–nulling method" in IEEE Photonics Technology Letters, vol. 13, No. 1, pp. 88–90, Jan. 2001.

Valentin, Juan D. Office Action for U.S. Appl. No. 10/218, 681, mailed Jan. 22, 2004, pp. 1–16.

* cited by examiner

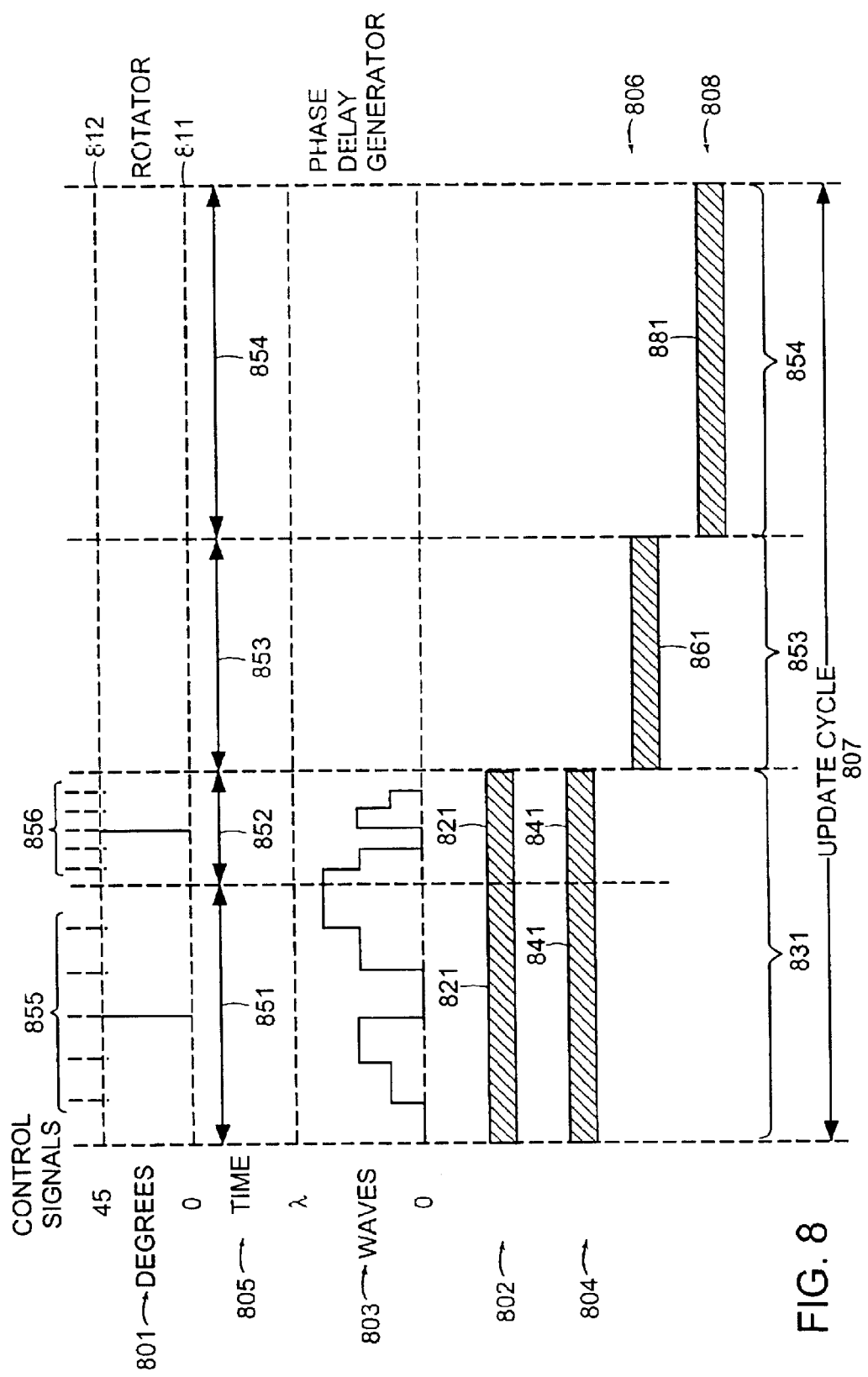

POLARIZATION MODE DISPERSION COMPENSATION IN OPTICAL TRANSMISSION MEDIA

CROSS REFERENCE TO RELATED APPLICATIONS

The present application claims the benefit of copending provisional application U.S. Ser. No. 60/276,982 filed Mar. 19, 2001.

FIELD OF THE INVENTION

The invention relates to the field of optical transmission systems. In particular, the invention relates to the monitoring and modification of optical signals in an optical transmission medium.

BACKGROUND

The input data stream of an optical transmission system may be viewed as a series of light pulses representing digital bits. The bit rate of current optical transmission systems generally range from 10 GHz to 40 GHz resulting in light pulses (or bit periods) that are, respectively, 100 to 25 picoseconds wide. Receivers in an optical transmission system convert each bit period in the data stream into digital ones or zeros by determining, for each bit period, whether a light pulse has been received (digital one) or not (digital zero). Polarization mode dispersion (PMD) is a phenomenon that may distort the light pulses of the data stream and thus impair the ability of a receiver to determine whether a bit period should be converted into a one or zero. As a result, PMD limits the transmission accuracy and capacity of optical transmission systems.

Polarization mode dispersion arises from birefringence of the transmission medium of an optical transmission system. Birefringence is present in transmission medium comprised of even so called "single-mode" optical fiber because of fiber imperfections and asymmetric stresses that result in a noncircular fiber core. An ideal single-mode optical fiber has a circular core, i.e., the core is isotropic and without eccentricity. Such an ideal fiber is isotropic, that is, the refractive index of the fiber is independent of the orientation of the electric field or, equivalently, the polarization of the light. Anisotropy (e.g., eccentricity) in an optical fiber core leads to birefringence and, therefore, different polarizations of light propagate through the optical fiber at different velocities.

Light propagation in optical fiber may be viewed as governed by two fundamental or principal modes. These principal modes are known as "principal states of polarization" ("PSPs"). If a PSP is introduced into a fiber link, the polarization at the output of the link will be substantially constant to first order in frequency. In an ideal single-mode fiber the PSPs are degenerate, i.e., indistinguishable. Anisotropy of the fiber core lifts this degeneracy. As a result, the PSPs travel at different group velocities and separate into two temporally displaced pulses. The separation of the PSPs due to different group velocities is known as polarization mode dispersion (PMD), and the temporal spread between the two PSPs is known as the "differential group delay" ("DGD"). This temporal spreading can cause the light pulse of one bit period in the data stream to overlap with another bit period. This overlap impairs the ability of a receiver to determine whether a bit period should be converted into a one or zero. Consequently, PMD is a problem for optical transmission systems that results in data ambiguity, data loss, data corruption, and limited transmission capacity.

While various approaches to the PMD problem have been proposed, each presents limitations. For example, polarization-maintaining fiber is designed to maintain the input polarization through inherent optical properties, such as stress-induced anisotropy introduced by internal stress members within the fiber that cause birefringence and prevent cross-coupling of optical power between the PSPs. Unfortunately, this specialty fiber is not only expensive, but, short of wholesale replacement, cannot address PMD in existing "legacy" fiber networks.

Present electronic approaches, such as electrical distortion equalizers, also exhibit disadvantages. These approaches, which typically use a notch in the RF frequency response (i.e., response minima) at the receiver as an indicator of DGD, require modifications to conventional receiver electronics and tend to require high-speed digital or RF electronics.

Optical measurement approaches typically require either perturbing the laser source by polarization scrambling or by the introduction of frequency sidebands, or provide only indirect or qualitative measures of the polarization properties of the PMD. In an optical transmission system, perturbing the laser source for optical measurements is generally not practical and interrupts data transmission. Approaches that utilize only indirect or qualitative measures of PMD polarization properties, such as DGD and degree of polarization ("DoP") measurements, require use of an iterative procedure that compensates for PMD only after multiple operations. However, such multiple operations are time consuming; and thus, such iterative compensation approaches have drawbacks for application to high-speed transmission systems.

A need therefore exists for an approach providing a reliable measurement of PMD that avoids interrupting data transmission, and that allows for faster compensation of PMD effects.

SUMMARY OF THE INVENTION

The present invention provides a method and apparatus for obtaining a direct measure of PMD polarization properties without perturbing the laser source, and that compensates for PMD effects in a single operation. The present invention compensates for PMD by transferring the light signal in an optical transmission system substantially into a single PSP of the system including the compensator. As a result, each light pulse in the data stream is not substantially mixed with temporally adjacent light pulses or bit periods.

In one aspect, the present invention provides a method for compensating for PMD of a light signal in an optical transmission system. In one embodiment, the method measures the PMD polarization properties of the fiber link by introducing a phase delay between two different polarization components of a sample light signal from the optical transmission medium. The method interferes the two polarization components and measures the resulting interference signal. The method then uses interference signals measured at a plurality of phase delays to determine the DGD and the relative amplitudes and polarization states (e.g., orientation and ellipticity) of the PSPs. The DGD, relative amplitudes and polarization states of the PSPs provide a direct measure of the PMD polarization properties. As used herein, the term "PSP properties" refers to the polarization states and relative amplitudes of the PSPs, and the DGD between them. The polarization state and relative amplitudes of the PSPs also provide a direct measure of the polarization state of the light signal in the optical transmission system. Based on the PSP properties, the present invention determines a modification to the light signal that will transfer, preferably in a single operation, a sufficient fraction of the light signal energy into a single PSP of the optical transmission system to compensate for PMD effects. The "sufficient fraction" can be chosen by one of ordinary skill in the art to provide, for example, a suitable system outage probability or power penalty.

As used herein, the term "sufficient fraction" refers to an amount sufficient to avoid, for a particular transmission system or data transmission, bit error rate due to the effects of PMD. For example, where a data transmission comprises highly redundant and corruption resistant data, the sufficient fraction may be low. Similarly, when only low data transmission rates are desired, the sufficient fraction may be low. Conversely, where it is desired to operate the transmission system at high capacity and/or with high data accuracy (i.e. low data ambiguity, loss or corruption low bit error rate), the sufficient fraction may be very high, or even comprise transferring substantially all of the light signal energy into a single PSP. Accordingly, it is to be understood that one of ordinary skill in the art may determine in a straightforward manner (without undue experimentation) the sufficient fraction of light signal energy for transfer. For example, a sufficient fraction may comprise substantially all of the light signal energy.

In another embodiment, the method measures the PMD polarization properties by rotating the orientations of the polarization axes of a sample light signal and introducing a phase delay between two different polarization components of the sample light signal. The method interferes the two polarization components and measures the resulting interference signal. The method then uses interference signals measured at two or more phase delays for each of two or more rotational orientations of the sample light signal polarization axes to determine the PSP properties of the light signal. Based on the PSP properties, the present invention determines a modification to the light signal that will transfer, in a single operation, a sufficient fraction of the light signal energy into a single PSP of the optical transmission system.

In another embodiment, the method of the present invention compensates for PMD of the optical transmission system by adding to the incident light signal a DGD vector at an orientation such that, in this single operation, a sufficient fraction of the light signal energy is transferred into a single PSP of the optical transmission system embodying the incident fiber link and the PMD compensator.

In a preferred embodiment, the present invention determines substantially in parallel the PSP properties of a multitude of wavelength channels in an optical fiber, such as are present in a dense wavelength-division multiplexed ("DWDM") fiber. These properties include the polarization state of the PSPs, the relative amplitudes of the PSPs (i.e., the energy ratio between the two PSPs), the DGD, and the total power for multiple wavelength channels in the data stream. The bandwidth of each wavelength channel is primarily determined by the laser source linewidth and the data modulation bandwidth of the light signal.

In one version of this embodiment, the method introduces a phase delay between two different polarization components of a sample light signal. The method interferes the two polarization components to produce an interference signal, disperses the interference signal into spectrally contiguous wavelength bands, and measures interference signals for each wavelength subband. The method then measures interference signals for each wavelength subband at a plurality of phase delays to determine the PSP properties for each wavelength channel. Based on the PSP properties for a channel, the present invention determines a modification to the light signal in each wavelength channel that will transfer, in a single operation, a sufficient fraction of the light signal energy in that wavelength channel into a single PSP of that channel.

In another version of this embodiment, the method rotates the orientations of the polarization axes of a sample light signal and introduces a phase delay between two different polarization components of the sample light signal. The method interferes the two polarization components to produce an interference signal, disperses the interference signal for each channel into spectrally contiguous wavelength subbands, and measures interference signals for each wavelength subband. The method then measures interference signals for each wavelength subband at two or more phase delays for each of two or more rotational orientations of the light signal polarization axes to determine the PSP properties of the corresponding wavelength channels. Based on the PSP properties for a channel, the present invention determines a modification to the light signal that will transfer, in a single operation, a sufficient fraction of the light signal energy in that wavelength channel into a single PSP of that channel.

In preferred embodiment, the method of the present invention compensates for PMD of two or more wavelength channels of an optical transmission system. The method compensates for PMD of the wavelength channels substantially in parallel by adding to each channel substantially at the same time a DGD at an orientation such that, in this single operation, a sufficient fraction of the light signal energy in a channel is transferred into a single PSP of the channel.

In another embodiment, because the degree of PMD and the polarization state of the PSPs can change over time, the light signal is sampled, analyzed and the modification for the light signal updated on an intermittent, periodic or continuous basis.

In another aspect, the present invention provides an article of manufacture where the functionality of a method of the present invention is embedded on a computer-readable medium, such as, but not limited to, a floppy disk, a hard disk, an optical disk, a magnetic tape, a PROM, an EPROM, CD-ROM, or DVD-ROM.

In another aspect, the present invention provides an apparatus for compensating for PMD of a light signal in an optical transmission system. In one embodiment, the apparatus comprises an optical polarization monitor and a polarization state generator. The polarization monitor comprises a phase delay generator, interferometer and detector. The polarization monitor is configured to accept a sample light signal, and the phase delay generator introduces a phase delay between two different polarization components of the sample light signal. The interferometer is positioned to receive the phase-delayed light and interfere the two polarization components to produce an interference signal that is measured by the detector. The polarization state generator determines the DGD, relative amplitudes and polarization states of the PSPs based on the interference signals measured at a plurality of phase delays.

In another preferred embodiment, the polarization monitor also comprises a rotator. The polarization monitor is configured to accept a sample light signal. The rotator provides at least two rotational orientations of the polarization axes of the sample light signal with respect to an optical axis of the phase delay generator. The phase delay generator introduces a phase delay between two different polarization components of the sample light signal for each of the rotational orientations of the polarization axes. The interferometer is positioned to receive the phase-delayed light and interfere the two polarization components to produce an interference signal that is measured by the detector. The polarization state generator determines the DGD, relative amplitudes and polarization states of the PSPs based on the interference signals measured at two or more phase delays for each of two or more rotational orientations.

In one embodiment, the rotator comprises an electro-optical element that effectively rotates an optical axis of the phase delay generator. In another embodiment, the rotator comprises a mechanism that physically rotates the phase delay generator. Preferably, the rotator comprises a polarization rotator that rotates the polarization axes of the sample light signal. Suitable polarization rotators include, but are not limited to, Faraday rotators and combinations of waveplates.

In another embodiment, the polarization monitor determines, substantially in parallel, the PSP properties of two or more wavelength channels of an optical transmission system. In one version of this embodiment, the polarization monitor comprises a phase delay generator, an interferometer, a wavelength demultiplexer and an array of detectors. The polarization monitor also comprises a rotator. The interferometer is positioned to receive the phase-delayed light and interfere the two polarization components to produce an interference signal. The demultiplexer disperses the interference signal into spectrally contiguous wavelength subbands for the array of detectors. The array of detectors is configured such that the interference signals of each wavelength subband are measured substantially in parallel. The polarization state generator then determines the PSP properties for each wavelength channel based on the interference signals for the corresponding wavelength subbands measured either at a plurality of phase delays, at two or more rotational orientations of the polarization axes of the sample light signal.

In another embodiment, the present invention provides an apparatus for compensating for PMD of a light signal in an optical transmission system comprising an optical polarization monitor, a polarization state generator, a polarization controller, and a delay element. The polarization controller modifies the light signal such that a sufficient fraction of the energy of the light signal is transferred into a single PSP of the optical transmission system. In one version of this embodiment, the compensation stage comprises a polarization controller that changes the polarization state incident upon the delay element. The delay element then adds a substantially selectable DGD to the light signal at a selectable orientation. In a preferred version of this embodiment, the compensation stage comprises a polarization controller and delay element that adds a substantially fixed DGD to the light signal at a selectable orientation. The selected orientation is determined based on the PSP properties provided by the polarization state generator. The selected orientation is such that when the compensation stage adds a DGD to the light signal, the resultant light signal, i.e., modified light signal, has a sufficient fraction of its energy in a single PSP of the optical transmission system.

In another embodiment, the present invention provides an apparatus for compensating for PMD of two or more wavelength channels of an optical transmission system. The apparatus comprises a polarization monitor that monitors the PSP properties of the wavelength channels, a polarization state generator, and a multichannel polarization controller. The multichannel polarization controller modifies the light signal in each wavelength channel such that a sufficient fraction of the light energy in each channel is transferred into a single PSP of the channel. The multichannel polarization controller comprises a wavelength demultiplexer, a multichannel polarization controller, and a wavelength multiplexer. The demultiplexer disperses the signal light into spectrally contiguous dispersed channels, and the multichannel polarization controller adds to each wavelength channel a DGD at an orientation such that a sufficient fraction of the energy of the wavelength channel is in a single PSP of the corresponding wavelength channel. Subsequently, the wavelength multiplexer recombines the light received from the multichannel polarization controller. In one embodiment, the multichannel polarization controller comprises an array of polarization controllers, each device operating on a separate wavelength channel to introduce a DGD at a selectable orientation when combined with the delay element. Preferably, the polarization controllers form a substantially integrated array, and operate substantially in parallel on the wavelength channels.

In one version of this embodiment, the polarization controller adds a substantially selectable DGD to the light signal of a wavelength channel at a selectable orientation. Preferably, the polarization controller adds a substantially fixed-magnitude DGD at a selectable orientation. The orientation of the DGD added to a wavelength channel is selected based on the PSP properties of the channel. The selected orientation is such that when variable polarization device adds the DGD to the light signal of a channel, the resultant (i.e., modified) light signal has a sufficient fraction of its energy in a single PSP of that wavelength channel.

The foregoing and other features and advantages of the invention, as well as the invention itself, will be more fully understood from the description, drawings, and claims, which follow.

BRIEF DESCRIPTION OF THE DRAWINGS

FIG. 8 is a schematic illustration of one embodiment of a polarization monitoring method of the present invention.

DETAILED DESCRIPTION

The invention provides methods of and apparatus for optical signal monitoring and modification of particular benefit to the optical transmission of data in fiber-optic transmission systems. The present invention provides polarization properties of the light and/or PSPs of an optical transmission system. The polarization properties provided by the present invention may be used to provide a "deterministic solution" to the PMD problem that substantially compensates for PMD of the light signal to first order. As used herein, the term "deterministic solution" refers to the ability of the present invention to determine a single modification to the light signal that can substantially compensate for a given PMD (i.e., the PMD at any one time) to first order. The deterministic-solution approach of the present invention contrasts with techniques requiring iterative measurements and modifications to compensate for a given PMD.

One approach of the present invention to PMD compensation is to transfer a sufficient fraction of the light signal energy into a single PSP of the optical transmission system. The difficulties lie in determining in a reliable manner, without interrupting data transmission, the PSPs of the system and quickly modifying the light signal to compensate for the PMD. It is to be realized that the transfer of light into a single PSP can be thought of in two ways: either modifying the polarization state of the light signal such that it has a polarization vector orientation (e.g. a Stokes vector orientation) that is substantially the same as that of a PSP of the system, or modifying the polarization state of the system PMD vector such that it has a PMD vector orientation that is substantially the same as that of the incident light signal.

One intuitive way to understand the PMD compensation approach of the present invention involves a Poincare sphere representation of the light signal and optical transmission system. The electric field vector E of a light signal, such as in an optical fiber, may be expressed generally as a sum of x and y components, $E_x$ and $E_y$, with a constant phase offset ε:

$$E = \begin{bmatrix} E_x \\ E_y e^{i\varepsilon} \end{bmatrix}.$$ Eq. (1)

The electrical field vector generally is elliptically polarized, i.e., $E_x$ and $E_y$ are both non-zero, following an elliptical path in $E_x$ and $E_y$ over time. Linear and circular polarization are degenerate cases of elliptical polarization, with the electrical field vector tracing out in time a line or circle, respectively, rather than an ellipse. One convenient way to represent all possible polarizations is on a Poincare Sphere.

Figure 1:
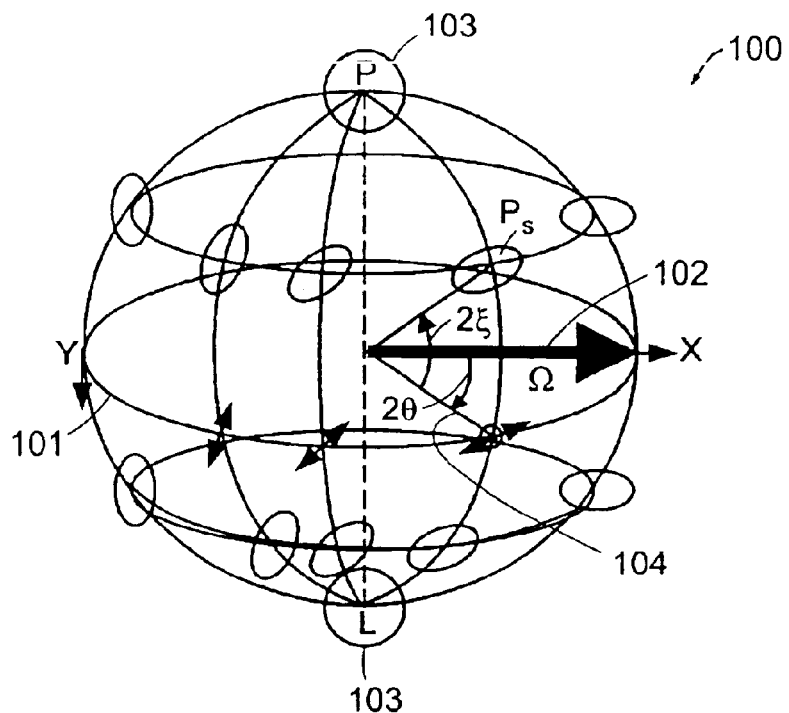
FIG. 1 shows a Poincare sphere representation of a PMD vector and PSPs of an optical transmission system.

Referring to FIG. 1, a Poincare Sphere representation 100 of polarization states is shown. A given latitude on the sphere represents a given ellipticity, with linear polarization at the equator 101 and circular polarization at the poles 103. In this representation, one degree of longitude on the sphere represents 0.5 degrees of physical rotation of a polarization axis. The handedness of the polarization changes in the two hemispheres, with right-handed polarization in the upper hemisphere and left-handed polarization in the lower. In addition, each longitude represents a fixed azimuth for the semi-major axis of the polarization ellipse.

In this representation, the PMD of the optical transmission system may be represented by a PMD vector $\vec{\Omega}$ 102 on the Poincare Sphere. The direction of the PMD vector $\vec{\Omega}$ 102 represents one of the PSPs of the system, while the magnitude of the vector is one-half the DGD. The polarization state of a given sample light signal (i.e., the input polarization state for the polarization monitor) is a linear combination of the two PSPs. An input polarization vector 104 (e.g. such as a Stokes vector) may be used to represent the light signal polarization state. The relative amount of light signal energy in one PSPs is given by $\cos^2(2\theta)$ and in the other by $\sin^2(2\theta)$, where ($2\theta$) is the angle on the Poincare Sphere between the input polarization vector 104 and the PMD vector $\vec{\Omega}$ 102. If the input polarization vector 104 falls along the PMD vector 102, then all the light signal energy, to first order, is in one PSP of the transmission system. Correspondingly, there is no energy, to first order, in the other PSP. As a result, there is no energy in one PSP (e.g., the fast PSP) of one bit period that can overlap with the other PSP (e.g., the slow PSP) of another bit period and thereby cause data loss, ambiguity or corruption. The potential overlap of different PSPs of different bit periods due to PMD is referred to herein as PMD spreading.

A PMD vector may also be used to represent each component in an optical transmission system (e.g., optical fiber sections, optical elements, couplers, multiplexers, switches, routers, etc.) the vector sum of which in a common coordinate frame is the total PMD vector for the system. It is to be realized that the total PMD vector of the system typically varies along the length of the transmission system and varies with time. For example, the total PMD vector 1 km from the light signal source is generally different from that 10 km from the source. Likewise, the total PMD vector at any one location can change with time due to, for example, changes in temperature and/or stress on components of the system. Thus, it is to be understood that a total or system PMD vector refers to a PMD vector at a particular system location and time.

Figure 2A:
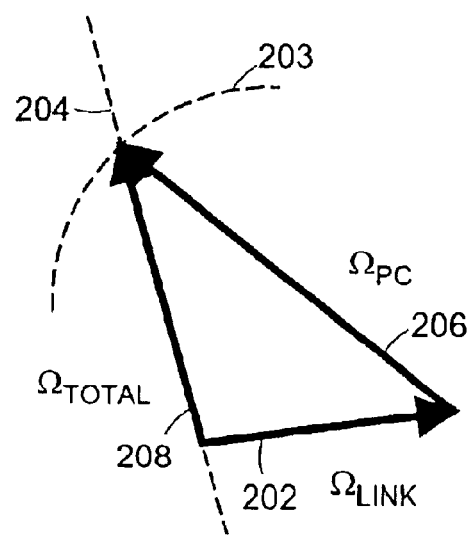
FIGS. 2A and 2B illustrate one embodiment of a PMD compensation approach of the present invention.

Referring to FIG. 2A, a schematic vector illustration of one embodiment of compensating for PMD according to the present invention is shown. The approach of the present invention is to transfer a sufficient fraction of the light signal energy into a single PSP of the optical transmission system. The PMD vector of the optical transmission system, absent contributions from the polarization controller and delay element of the present invention, is illustrated by the vector $\vec{\Omega}_{LINK}$ 202. The circular segment 203 represents a section of a Poincare Sphere lying in a plane defined by the vector $\vec{\Omega}_{LINK}$ 202 and the input polarization vector 204. In one embodiment, the approach of the present invention may be represented by the addition of a polarization control vector $\vec{\Omega}_{PC}$ 206 to the vector $\vec{\Omega}_{LINK}$ 202 such that the resultant PMD vector $\vec{\Omega}_{TOTAL}$ 208 has an alignment that is substantially the same as the input polarization vector 204. The input polarization vector 204 now substantially falls on the new system PMD vector $\vec{\Omega}_{TOTAL}$ 208. As a result, a sufficient fraction of the light signal energy is transferred into one PSP of the system, thereby compensating for the effects of PMD by substantially correcting for PMD spreading to first order.

Figures 2, 2B:
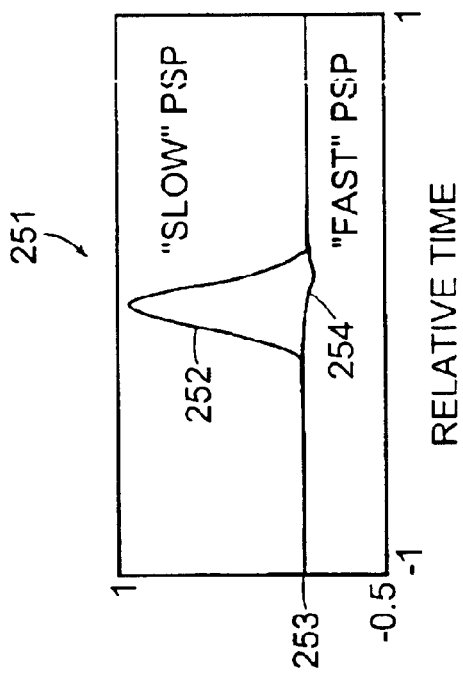
Figures 1, 2B:
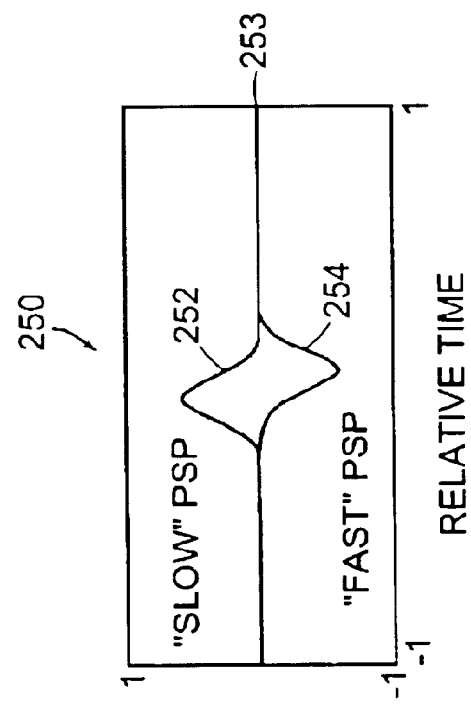

Referring to FIG. 2B, the effect of transferring a sufficient fraction of the light energy into a single PSP is shown. The plot on the left 250 illustrates the light signal energy in each PSP 252, 254 before PMD compensation, and the plot on the right 251 illustrates the light signal energy in each PSP after PMD compensation according to the present invention. The area between the waveform representing a PSP 252, 254 and the "zero" line 253 is proportional to the energy in the PSP represented by the waveform. In the embodiment of FIG. 2B, PMD compensation provided by the present invention transfers a sufficient fraction the light signal energy from the fast PSP 254 into the slow PSP 252. However, it is to be realized that it is not crucial to the present invention that all of the light signal energy be transferred into a single PSP. Rather, a fraction of energy insufficient to cause noticeable PMD spreading may remain in a PSP as illustrated in the right plot 251 by the energy remaining in the fast PSP 254 after PMD compensation.

It is to be understood that the new system DGD, $DGD_{TOTAL}$, is typically not zero. For example, the lengths of the vectors in FIG. 2A are proportional to the DGD associated with each vector. Accordingly, for the embodiment illustrated in FIG. 2A, the resultant system DGD is, $$DGD_{TOTAL} = \sqrt{DGD_{LINK}^2 + DGD_{COMP}^2 + 2DGD_{LINK}DGD_{COMP}\cos(2\theta)},  \quad \text{Eq. (2)}$$

where $DGD_{LINK}$ is the DGD associated with the vector $\vec{\Omega}_{LINK}$ 202 and $DGD_{COMP}$ is the DGD associated with the compensation vector $\vec{\Omega}_{PC}$ 206. In one embodiment, $DGD_{COMP}$ is greater than one bit period of the data stream, and preferably, $DGD_{COMP}$ is greater than $DGD_{LINK}$ to facilitate producing a system PMD vector $\vec{\Omega}_{TOTAL}$ 208 that falls substantially on the input polarization vector 204.

In one aspect of the present invention, the physical process represented by the addition of a polarization control vector is provided by a polarization controller and a delay element. The polarization controller and delay element may provide a single polarization control vector, or a separate polarization control vector for each of two or more wavelength channels. In one embodiment, the polarization controller comprises a polarization controller and a delay element. The delay element provides a DGD, $DGD_{COMP}$, and the polarization controller varies the orientation of $DGD_{COMP}$ with respect to the light signal on the Poincare sphere. The delay element may provide a variable DGD or, preferably, a substantially fixed DGD. The polarization controller and delay element may comprise a single integrated optical component, or two or more optical components. For example, in one embodiment, the polarization controller comprises two optical components, a variable liquid crystal ("LC") polarization controller and a polarization maintaining fiber ("PMF") with the variable LC polarization controller serving as a polarization controller and the PMF serving as a delay element.

The orientation selected for the polarization control vector is determined based on the PSP properties of the system. The polarization properties are ascertained from a sample light signal that comprises at least a portion of the light signal in the optical transmission system. In one embodiment, the present invention introduces a phase delay between two different (preferably, but not necessarily, orthogonal) polarization components of the sample light signal, and then interferes the two polarization components to produce an interference signal. As each polarization component is generally a superposition of the two PSPs of the system, the resulting interference signal contains auto-correlation and cross-correlation terms between the PSPs.

The polarization monitoring and PMD compensation approach of the present invention is amenable to substantially simultaneous application to two or more wavelength channels in an optical transmission system. In one embodiment, the present invention introduces a phase delay between two different (preferably, but not necessarily, orthogonal) polarization components of the sample light signal, and then interferes the two polarization components to produce an interference signal. The interference signal is dispersed into spectrally contiguous wavelength subbands to facilitate obtaining an interference signal for each wavelength channel.

The interference signals obtained at a plurality of phase delays may be used to ascertain the relative amplitudes and polarization states of the PSPs and the DGD between them. As the phase delay between the two polarization components is varied (for example, through a full wave of delay) the intensity of an interference signal varies sinusoidally through a portion of a period, with the portion of the period observed depending upon the DGD of the optical transmission system, i.e., $DGD_{LINK}$. As a result, the intensity of the interference signal, I, may be expressed as a sinusoidal function of the phase delay d in units of time, $$I = I_0 + C\cos(d\omega_0) + S\sin(d\omega_0) \quad \text{Eq. (3)},$$

for a fixed measurement frequency $\omega_o$. The sinusoidal signal of Eq. (3) may be solved for the coefficients $I_0$, C, and S. From these coefficients, the polarization properties of the sample light signal and vector $\vec{\Omega}_{LINK}$ may be determined.

Correspondingly, in embodiments where interference signals are obtained for two or more wavelength subbands, the intensity of the interference signal of each wavelength subband, $I(\omega)$, may be expressed as a sinusoidal function of phase delay, $$I(\omega) = I_0 + C\cos(d\omega) + S\sin(d\omega) \quad \text{Eq. (4)},$$

where $\omega$ is a frequency corresponding to the associated wavelength subband. The sinusoidal signal of Eq. (4) may be solved for the coefficients $I_0$, C, and S. Further, in the limit of first order PMD, the C and S coefficients are also a sinusoidal function of frequency, which may be expressed as, $$C(\omega) = C_0 + C_c \cos(\tau\omega) + C_s \sin(\tau\omega) \quad \text{Eq. (5)}$$

$$S(\omega) = S_0 + S_c \cos(\tau\omega) + S_s \sin(\tau\omega) \quad \text{Eq. (6)}$$

where $\tau$ is a time delay related to the DGD of the light signal of the wavelength channel. For a given data set, these equations can be solved for the DGD $\tau$ and the $S(\omega)$ and $C(\omega)$ coefficients. From these coefficients, the PSP properties for each wavelength channel may be determined.

In another embodiment, the present invention changes the rotational orientation of the polarization axes of the polarization components of the sample light signal prior to introduction of a second series of phase delays. This redundancy may eliminate cases in which the device may not be able to calculate all required polarization information from the acquired data. The resultant interference signals obtained at two or more rotational orientations provide additional information on the auto-correlation and cross-correlation of the PSPs. In one embodiment, the present invention, for each of two or more rotational orientations, (1) introduces a phase delay between the two polarization components of the sample light signal; and then (2) interferes the two polarization components to produce an interference signal for the given rotational orientation. In one version of this embodiment, interference signals are obtained for two different rotational orientations. In one version, the first rotational orientation is produced by a rotation of the polarization axes by 0° (i.e., no rotation), and the second rotational orientation is produced by a rotation of the polarization axes by 45°. It is to be realized, however, that the exact rotational orientation of the axes is not crucial to the present invention; rather, any set of non-degenerate rotational orientations may be used. The resultant interference signals for each rotational orientation may also be expressed as sinusoidal functions of phase delay with the same functional form as Eq. (3).

In addition, the approach of changing the rotational orientation of the polarization axes of the sample light signal prior to introduction of a phase delay is amenable to substantially simultaneous application to two or more wavelength channels. In one embodiment, for each of two or more rotational orientations, the present invention introduces a phase delay between the two polarization components of the sample light signal, and interferes the two polarization components to produce an interference signal for the given rotational orientation. The interference signal is then dispersed into spectrally contiguous wavelength subbands to facilitate obtaining an interference signal for each wavelength channel for the given rotational orientation. The resultant interference signals for each rotational orientation, φ, may also be expressed as sinusoidal functions of phase delay with the same functional form as Eq. (4).

For example, where two rotational orientations are used, such as φ=0° and φ=45°, the resulting interference signals for each wavelength subband, $I^\phi(\omega)$ may be expressed as follows, $$I^0(\omega) = I_0^0 + C^0 \cos(d\omega) + S^0 \sin(d\omega) \qquad \text{Eq. (7),}$$

$$I^{45}(\omega) = I_0^{45} + C^{45} \cos(d\omega) + S^{45} \sin(d\omega) \qquad \text{Eq. (8).}$$

These sinusoidal signals can be solved for $I_0^0$, $C^0$, $S^0$, $I_0^{45}$, $C^{45}$, and $S^{45}$ for each wavelength subband. Further, in the limit of first-order PMD, the $C^\phi$ and $S^\phi$ coefficients are also sinusoidal across frequency, which may be expressed as, $$C^0(\omega) = C_0^0 + C_c^0 \cos(\tau\omega) + C_s^0 \sin(\tau\omega) \qquad \text{Eq. (9),}$$

$$S^0(\omega) = S_0^0 + S_c^0 \cos(\tau\omega) + S_s^0 \sin(\tau\omega) \qquad \text{Eq. (10),}$$

$$C^{45}(\omega) = C_0^{45} + C_c^{45} \cos(\tau\omega) + C_s^{45} \sin(\tau\omega) \qquad \text{Eq. (11),}$$

$$S^{45}(\omega) = S_0^{45} + S_c^{45} \cos(\tau\omega) + S_s^{45} \sin(\tau\omega) \qquad \text{Eq. (12).}$$

For a given data set, these equations can be solved for the DGD τ and the S(ω) and C(ω) coefficients. From these coefficients, the PSP properties for each wavelength channel may be determined.

For example, the PSP properties of the light signal in a wavelength channel may be determined from, $$X_r = \frac{1}{8 C_0^{45}} \left( \frac{2\wp}{1-\wp} \right)(-C_c^0 + 2 S_s^{45}), \qquad \text{Eq. (13)}$$

$$X_i = \frac{1}{8 C_0^{45}} \left( \frac{2\wp}{1-\wp} \right)(C_s^0 + 2 S_c^{45}), \qquad \text{Eq. (14)}$$

$$E_{1x}^2 = \left( \frac{1-\wp}{\wp C_0^{45}} \right) C_s^0 + \frac{S_c^0}{2 S_s^{45} - C_c^0}, \qquad \text{Eq. (15)}$$

$$E_{1y}^2 = \left( \frac{1-\wp}{\wp C_0^{45}} \right) S_s^0 - \frac{C_c^0}{2 S_s^{45} - C_c^0}, \qquad \text{Eq. (16)}$$

$$\tan\varepsilon = -\frac{S_0^0}{C_0^0}, \qquad \text{Eq. (17)}$$

where $$\wp = 2 \left( \frac{1+Y^2}{1-Y^2} \right) \frac{C_0^{45}}{I_{input}}, \qquad \text{Eq. (18)}$$

and $$Y \equiv \frac{E_{1y}}{E_{1x}} = \sqrt{\frac{S_s^0 - 2 S_s^{45}}{S_s^0 - C_c^0}} \,; \qquad \text{Eq. (19)}$$

wherein $I_{input}$ represents the intensity incident into the monitor, and can be determined, for example, by summing the detected intensities for two dither settings separated by one-half wave, or by summing the intensities of a series of measurement pairs. The PMD vector at the monitor is substantially oriented toward the Principal State of Polarization given by $E_{1x}$, $E_{1y}$, and ε, while the length of the vector is determined by the DGDτ.

In another aspect, the present invention provides an apparatus that facilitates the determination of PSP properties. In various embodiments, the apparatus comprises a polarization monitor and a polarization state generator. Various embodiments of a polarization monitor according to the present invention are described below in connection with further descriptions of various embodiments of the methods of the present invention.

Figure 3A:
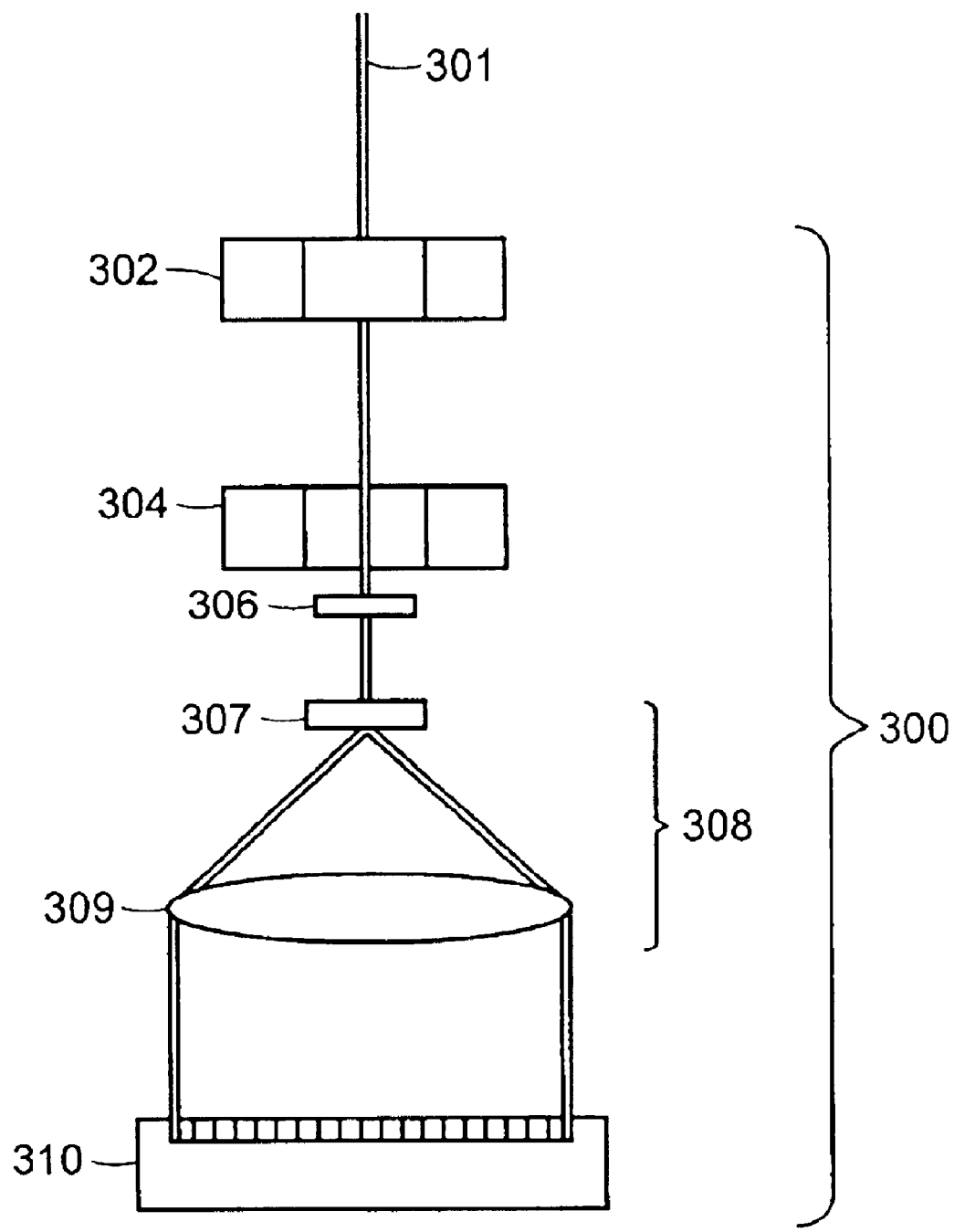
FIGS. 3A and 3B are schematic illustrations of various embodiments of a polarization monitor of the present invention.
Figure 3B:
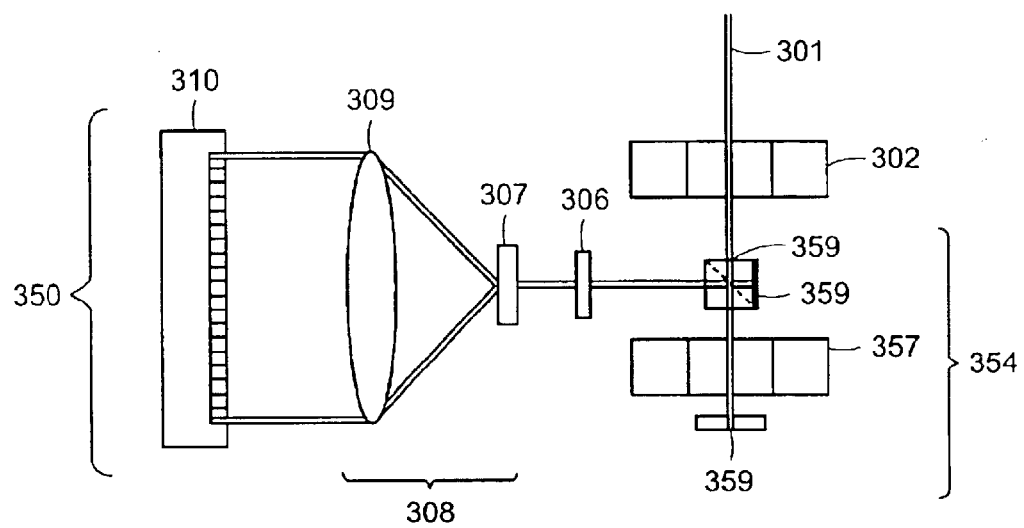

Referring to FIGS. 3A and 3B, in various embodiments, a polarization monitor according to the present invention comprises a rotator 302, a phase delay generator 304, 354, an interferometer 306, a wavelength demultiplexer 308, and a detector 310. As illustrated in FIGS. 3A and 3B, in one embodiment, a sample light signal 301 passes through the rotator 302, which enables the rotational orientation of the sample light signal polarization ellipse to be changed relative to an optical axis of the phase delay generator 304, 354. Suitable rotators include any element that can rotate the polarization axes of a light signal (polarization rotators) and/or an optical axis of the phase delay generator while substantially maintaining the incident ellipticity.

For example, suitable rotators include, but are not limited to, Faraday rotators, two switchable half-wave plates with fast axes either aligned or separated in azimuth by one-half the desired rotation angle, and two variable phase retarders with fast axes separated by one-half the desired rotation angle. In another embodiment, the rotator rotates an optical axis of the phase delay generator. Such a phase-delay-generator rotator may comprise, for example, an element that physically rotates the phase delay generator or a phase delay generator with a switchable optical axis.

In other embodiments, the polarization monitor of the present invention does not include a rotator, and interference signals are not obtained at two or more rotational orientations of the polarization axes of the sample light signal. For example, in cases where no polarization axis of the sample light signal lies along an optical axis of a phase delay generator that comprises a variable retarder, no rotator is necessary. But where a polarization axis of the sample light signal is in fact substantially linearly polarized along an optical axis of the phase delay generator, no phase delay is added between the two polarization components of the sample light signal, and a rotator may be added before the phase delay generator in order to address this problem.

Referring again to FIGS. 3A and 3B, in one embodiment, the sample light signal passes from the rotator 302 and into a phase delay generator 304, 354 that delays one polarization component of the sample light signal with respect to the other. Delaying one polarization component relative to the other may be accomplished, for example, by propagating the polarization components through optical paths of different lengths, or through a variable birefringent element. In various embodiments, the phase delay generator comprises a variable birefringent element 304. Suitable variable birefringent elements include, but are not limited to, variable retarders. Preferably, the variable retarder comprises either an electro-optic and/or liquid crystal waveplate. In other embodiments, the phase delay generator comprises an element that propagates the polarization components through optical paths of different lengths.

Referring to FIG. 3B, in one embodiment, the phase delay generator 354 comprises a polarization-splitting beamsplitter 355 and a variable delay element 357. The sample light signal is then split into two beams by a polarizing beamsplitter ("PBS") 355, which transmits one polarization component (e.g., $E_x$) and reflects the other (e.g., $E_y$). A quarterwave plate and reflector 359 in each arm rotates the polarization to recombine the two beams after the beamsplitter. A variable phase delay is induced in one of the separated beams (i.e., polarization components) by a variable delay element, 357 creating a variable retardance between the two propagation paths. Possible implementations of the variable delay element include, but are not limited to, fixed axis liquid crystal retarders, variable retardance waveplates, and spatially variable mirrors positioned behind at least one of the quarterwave plates.

Figure 4:
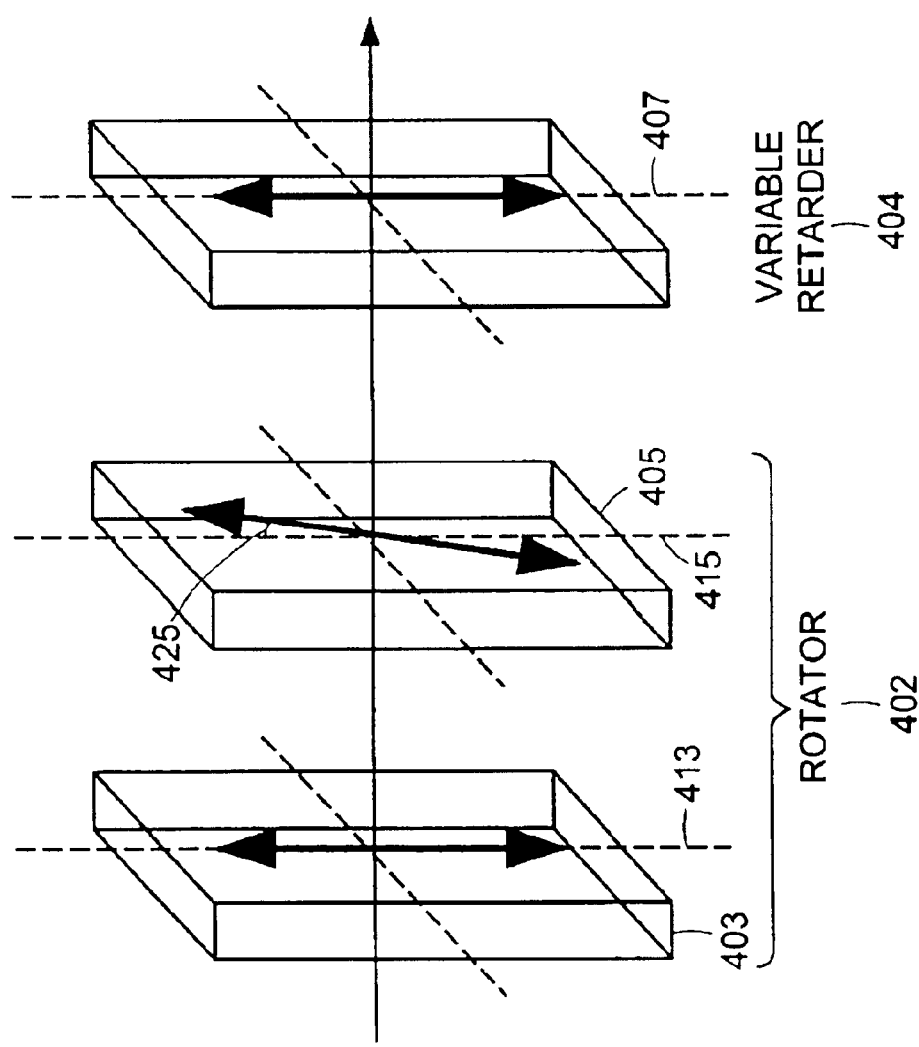
FIG. 4 is a schematic illustration of one embodiment of a rotator and phase delay device of the present invention.

Referring to FIG. 4, a preferred embodiment of a rotator 402 and phase delay generator 404 is shown. Preferably, the rotator 402 comprises a first switchable halfwave plate 403 and a second switchable halfwave plate 405, and the phase delay generator 404 comprises a variable retarder with fast axis aligned at a fixed orientation relative to the fast axes 413, 415 of the halfwave plates 403 and 405. In one embodiment, the orientation of the fast axis of the second halfwave plate 405 is then rotated by $\phi/2$ 425 with respect to the fast axis of the first halfwave plate 403 to change the rotational orientation of the polarization axes of the sample light signal by $\phi$ with respect to an optical axis of the phase delay generator 404. The orientation may then be reset by changing the retardance of the halfwave plates to zero.

Referring again to FIGS. 3A and 3B, the sample light signal passes from the phase delay generator 304, 354 and into an interferometer 306. The interferometer 306 mixes orthogonal polarization components of the sample light signal under conditions that can create interference between them, thereby producing an interference signal. Preferably, the interferometer comprises a 45° linear analyzer. It is to be understood, however, that any optical element or arrangement of optical elements that can recombine the polarization components of a light signal under conditions that create interference between them may serve as an interferometer in the polarization monitor of the present invention.

In various embodiments of the invention, the interference signal produced by the interferometer is then measured by a detector. In various other embodiments, the interference signal is spectrally dispersed into contiguous wavelength subbands, and different detector elements receive an interference signal corresponding to a particular wavelength channel of the optical transmission system. The detector elements may comprise an array of detectors, e.g., two or more physically separate detectors, or an integrated detector array. Examples of suitable detector arrays include, but are not limited to, charge-coupled device ("CCD") arrays, integrated photodiode arrays, and arrays of discrete detectors. In telecommunications applications, InGaAs photodiodes are preferred for both array and discrete detector applications. However, as used herein and in the claims, it is to be understood that the terms "array of detectors" and "detector array" may be used interchangeably. That is, when an element is described by the term "array of detectors," it is to be understood that the term also encompasses a "detector array," and vice versa.

Referring again to FIGS. 3A and 3B, in one embodiment, the interference signal produced by the interferometer 306 passes through a wavelength demultiplexer 308, which spectrally disperses the sample light signal into spectrally contiguous wavelength subbands. As a result, the demultiplexer 308 provides an interference signal for each wavelength subband. In one embodiment, each wavelength channel of a light signal (e.g., such as a DWDM signal) is segmented by the spectral dispersal into at least two wavelength subbands. Preferably, the wavelength demultiplexer segments each wavelength channel into five to fifteen wavelength subbands. Examples of suitable wavelength demultiplexers include, but are not limited to, array waveguide gratings (AWG), volume phase grating spectrometers, and reflective grating spectrometers, in both free-space and planar implementations.

The spectral dispersion of the interference signal into interference signals for each wavelength subband facilitates the determination of PSP properties for multiple wavelength channels of a light signal. Further, spectral dispersal of the interference signal across a detector array allows interference signals for multiple channels to be measured substantially in parallel. For example, in one embodiment, the wavelength demultiplexer 308 spectrally disperses the interference signal into spectrally contiguous subbands across a detector array 310. Different sets of elements of the detector array 310 then receive at substantially the same time interference signals corresponding to different wavelength channels. As a result, the interference signals for multiple wavelength channels may be measured substantially in parallel, and this information used by a polarization state generator to determine the relative amplitudes and polarization states of the PSPs and the DGD for multiple wavelength channels.

A polarization state generator may comprise either an analog and/or digital device. The polarization state generator determines the polarization state and relative amplitudes of the PSPs of the light signal and the DGD between them. In one embodiment, the polarization state generator determines the PSP properties based on the measured interference signals for a plurality of phase delays at each of two or more rotational orientations of a sample light signal. Further, the polarization state generator may determine substantially in parallel the PSP properties of multiple wavelength channels based on measured interference signals for a plurality of phase delays at each of one or more rotational orientations of a sample light signal. Preferably, the polarization state generator determines the PSP properties of multiple wavelength channels also based on a relationship between the interference signals observed for different wavelength subbands within the different wavelength channels.

In one embodiment, the polarization state generator determines the PSP properties using logic substantially in accordance with equations (3)–(6). In another embodiment, the polarization state generator determines the PSP properties using logic substantially in accord with equations (7)–(19). However, it is to be understood that the polarization state generator may use any logic suitable for determination of the PSP properties based on interference signals for a plurality of phase delays at each of one or more rotational orientations of a sample light signal.

The logic of the polarization state generator may be implemented by an analog circuit, digital circuit and/or as software on a general-purpose computer. The polarization state generator may produce a human readable display of the relative amplitude and polarization states of the PSPs and the DGD between them, for example, such as that produced by a printer or computer screen. However, it is not crucial to the present invention whether the polarization state generator produces either a human readable and/or machine-readable only output. For example, the polarization state generator may produce only machine-readable electrical signals sufficient to control a polarization controller that compensates for PMD in the optical transmission system.

It is to be realized that various embodiments of the polarization monitor of the invention are amenable to use as a multichannel Stokes vector polarimeter, as the polarization properties determined are sufficient to calculate the Stokes vector of the light in a given wavelength channel. Embodiments of the polarization monitor are also amenable to use as a multichannel power monitor, as the average intensity on one or more detector elements illuminated by the spectrum of one wavelength channel yields a measure of the average power of the channel. Finally, embodiments of the polarization monitor may be used as a multichannel spectrum analyzer, as the average intensity of each monitor detector channel yields a measure of the power in a spectral bin corresponding to the detector size and grating dispersion.

Figure 5:
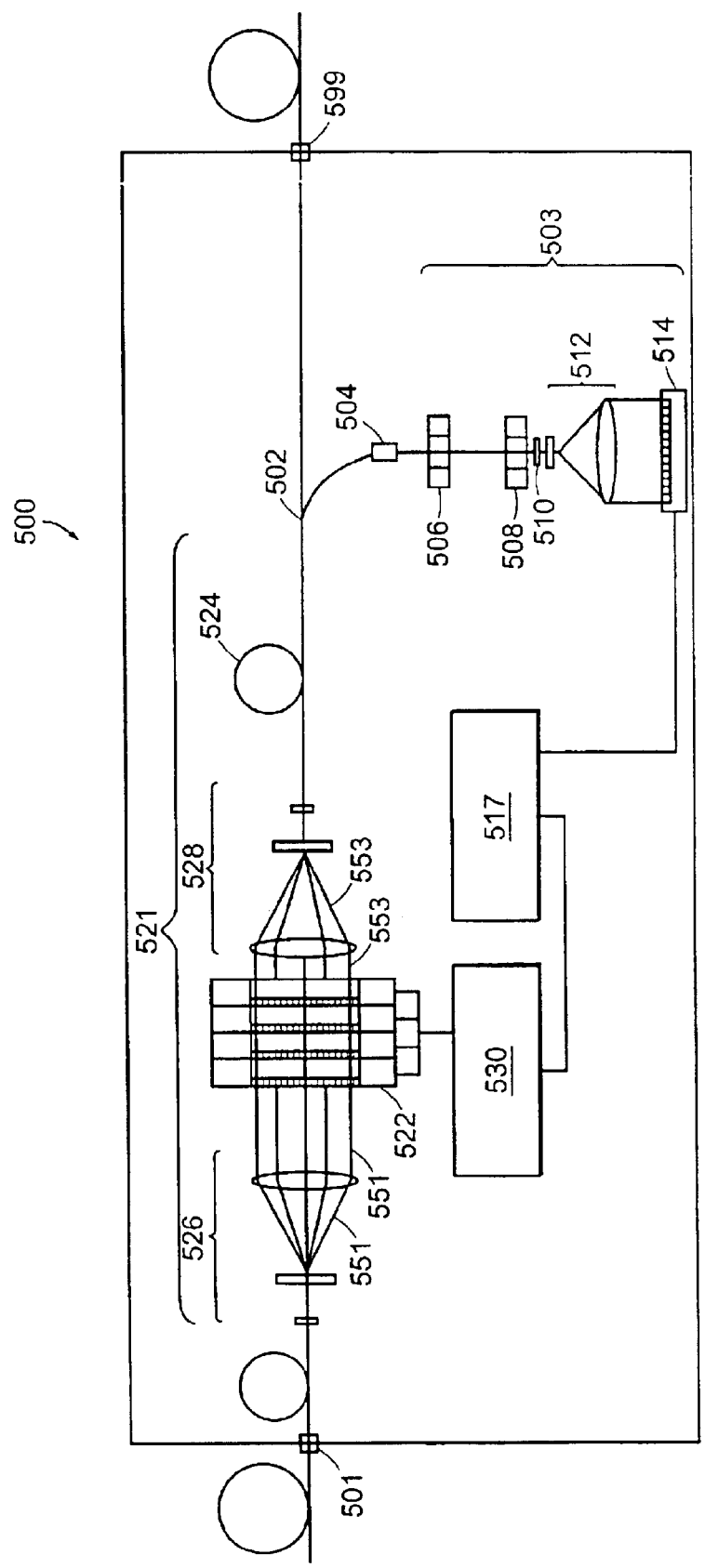
FIG. 5 is a schematic illustration of one embodiment of a PMD compensation apparatus of the present invention.
Figure 6:
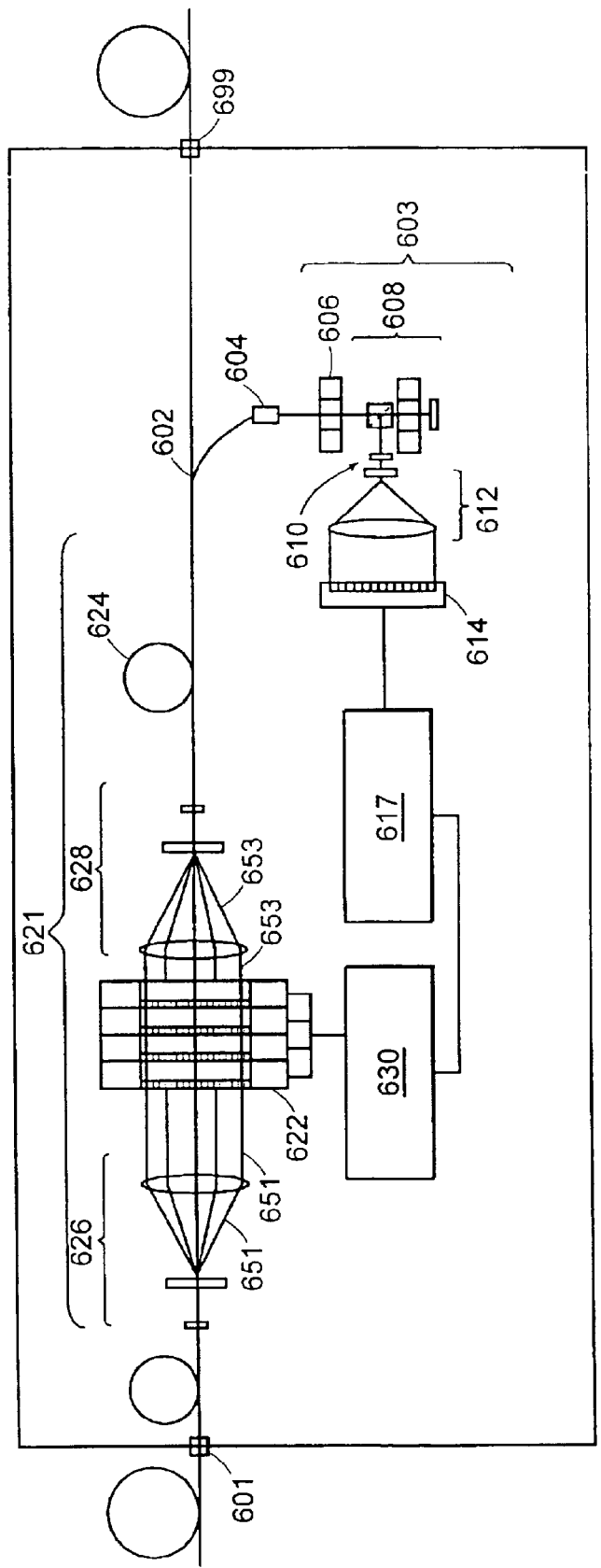
FIG. 6 is a schematic illustration of one embodiment of a PMD compensation apparatus of the present invention.

In one embodiment, the present invention provides an apparatus for compensating for PMD of a light signal in an optical transmission system. Referring to FIGS. 5 and 6, various embodiments of a PMD compensation apparatus are shown. The compensation apparatus comprises a polarization monitor 503, 603 a polarization state generator 517, 617, and a compensation stage 521, 621. The polarization monitor and compensation stage may comprise any of the embodiments described herein. As illustrated, the polarization monitor 503 of FIG. 5 is substantially similar to that described in FIG. 3A and accompanying text, while the polarization monitor 603 of FIG. 6 is substantially similar to that described in FIG. 3B and accompanying text.

In operation, the polarization monitor 503, 603 provides to the polarization state generator 517, 617 measurements of interference signals at a plurality of phase delays for each of one or more rotational orientations of a sample light signal. The polarization state generator 517, 617 in turn determines the PSP properties of the light signal, or one or more wavelength channels of the light signal, based on the measurements provided by the polarization monitor 503, 603. In one embodiment, the polarization state generator 517, 617 provides a control signal to a polarization controller driver 530, 630 that provides control signals for the polarization controller 522, 622 in the compensation stage 521, 621, which then adds a DGD to the light signal at a selectable orientation such that the light signal energy is transferred into substantially one PSP of the optical transmission system. Alternatively, as previously described, the compensation stage may also be viewed as modifying the PSPs of the optical transmission system such that the polarization state of one PSP is substantially the same as that of the light signal.

Referring again to FIGS. 5 and 6, in various embodiments, the compensation stage comprises a polarization controller 522, 622 and a delay element 524, 624. Preferably, the delay element 524, 624 has a substantially fixed DGD that is greater than the DGD of the optical transmission system associated with the PMD to be compensated. Accordingly, where the delay element 524, 624 has a substantially fixed DGD, the polarization controller driver 530, 630 provides control signals only to the polarization controller 522, 622. It is to be realized, however, that the polarization controller driver 530, 630 and/or the polarization state generator 517, 617 may receive input signals from a variety of sources including, but not limited to sensors (e.g. temperature, positional, power, etc.), system diagnostic and control systems, system clocks, etc., to facilitate PMD compensation. For example, the DGD of the delay element 524, 624, may vary with temperature; as a result, an input signal from a delay element temperature sensor may be used to determine the DGD of the delay element.

As illustrated in FIGS. 5 and 6, the compensation stage 521, 621 is adapted to compensate for PMD in multiple wavelength channels of the optical transmission system. In the illustrated embodiments, the compensation stage 521, 621 comprises (in the order of a typical light signals optical path from source to receiver) a wavelength demultiplexer 526, 626, a polarization controller 522, 622, a wavelength multiplexer 528, 628, and a delay element 524, 624. The wavelength demultiplexer 526, 626 disperses the light signal into spectrally contiguous wavelength subbands, represented by lines 551, 651. The polarization controller operates on each wavelength channel so that the DGD of the delay element 524, 624, adds at an orientation such that a sufficient fraction of the energy of the wavelength channel is in a single PSP of the corresponding wavelength channel. Generally, the polarization controller adds a DGD at a different orientation for each wavelength channel. Subsequently, the wavelength multiplexer recombines the light (represented by lines 553, 653) operated on by the polarization controller.

As illustrated in FIGS. 5 and 6, the compensation stage 521, 621 precedes the polarization monitor 503, 603 in the sense that the optical path of a light signal traveling from point 501,601 to point 599, 699 traverses the compensation stage prior to encountering the optical monitor. However, it should be realized that the placement of the compensation stage either "before" or "after" the polarization monitor is not crucial to the present invention. For example, where the polarization monitor precedes the polarization controller, the Jones or Mueller matrices of the polarization controller may be used to transform the polarization states between the two ends of he polarization controller.

A compensation stage useful in the present invention may take a variety of forms. Preferably, the delay element of the controller comprises a polarization maintaining fiber ("PMF"). However, suitable delay elements include, but are not limited to, free space and fiber delay elements, or birefringent crystals such as calcite or yttrium vanadate. Suitable wavelength multiplexers and demultiplexers, as illustrated in FIGS. 3A, 3B, 5 and 6 may comprise a grating 307, 537, 637 and a dispersive collimator 309, 539, 639. Additional suitable wavelength demultiplexers and multiplexers include, but are not limited to, array waveguide gratings (AWGs), volume phase grating spectrometers, and reflective grating spectrometers, in both free-space and planar implementations. A suitable polarization controller may also take various forms. For example, a polarization controller may comprise a series of variable waveplates, constructed from electro-optic crystals, lithium niobate waveguides, liquid crystals, fiber squeezers, and stressed silica retarders.

Figure 7:
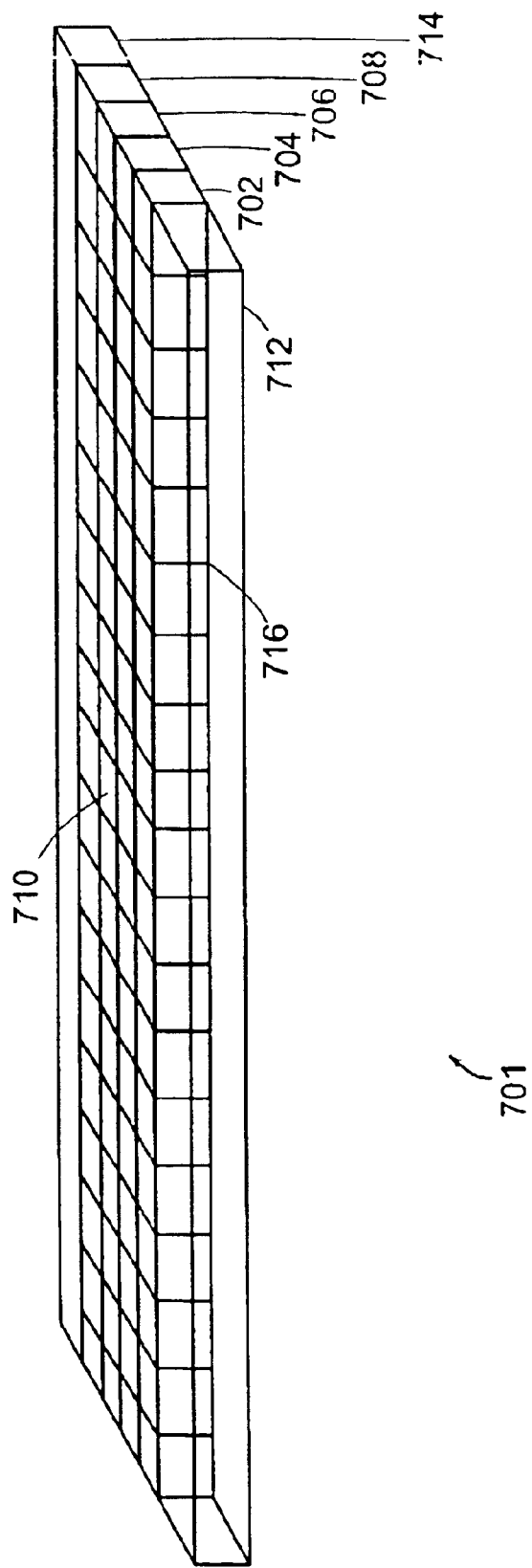
FIG. 7 is a schematic illustration of one embodiment of a polarization controller for a compensation stage of the present invention.

Preferably, the compensation stage comprises a delay element with a substantially fixed DGD and a LC polarization controller. Referring to FIG. 7, a preferred embodiment of a LC polarization controller is shown. The LC polarization controller 701 comprises a stack of four LC waveplates 702, 704, 706, and 708. Preferably, the LC waveplate stack is less than 10 mm thick, and the absolute retardance error of the LC waveplates is preferably no greater than 4 nm per waveplate.

Preferably, each LC waveplates comprises an array of LC cells 710 contained between optical quality glass coated with a conductive indium tin oxide (ITO) coating. Each individual LC cell may act as a variable waveplate from substantially 0 to 1.2 waves in the wavelength band of interest, and is controlled by an individual ITO electrode. The LC cells are electrically controlled with a response time preferably less than 3 ms. The temporal response can be reduced, for example, by increasing the temperature of the device.

The four waveplates 702, 704, 706, and 708 are preferably arranged with their rub directions nominally at 0°, 45°, 0°, and 45°, respectively, and laminated together with an optically clear epoxy index matched in the wavelength region of interest to the glass. Preferably, the registration of the cells (in the x-y direction) is better than 25 μm between the first LC waveplate 702 and the last LC waveplate 708. In addition, the LC polarization controller may further comprise an integrated front lens assembly 712 and/or an integrated rear lens assembly 714.

Preferably, the individual LC cells are sized such that greater than 90% of each ITU grid spacing after the demultiplexer for each communications channel is transmitted through the active area in each cell. In other words, preferably less than 10% of the bandwidth between ITU channels is lost to the intercell gaps 716 between LC cells.

In some embodiments, the functionality of the methods described above may be implemented as software on a general purpose computer. In addition, such a program may set aside portions of a computer's random access memory to provide control logic that affects rotator control, phase delay generator control, interferometer control, interference signal measuring, polarization controller control and the operations with and on the measured interference signals. In such an embodiment, the program may be written in any one of a number of high-level languages, such as FORTRAN, PASCAL, C, C++, or BASIC. Further, the program may be written in a script, macro, or functionality embedded in commercially available software, such as EXCEL or VISUAL BASIC. Additionally, the software could be implemented in an assembly language directed to a microprocessor resident on a computer. For example, the software could be implemented in Intel 80×86 assembly language if it were configured to run on an IBM PC or PC clone. The software may be embedded on an article of manufacture including, but not limited to, a "computer-readable medium" such as a floppy disk, a hard disk, an optical disk, a magnetic tape, a PROM, an EPROM, or CD-ROM.

EXAMPLE OF POLARIZATION MONITORING AND PMD COMPENSATION

Referring to FIGS. 5 and 8, an example of one embodiment of monitoring and compensating for PMD in an optical transmission system is as follows. A sample light signal is tapped from the optical transmission system with a 90/10 optical tap 502 and input into a polarization monitor 503 via an optical coupler 504. The polarization monitor comprises a polarization rotator 506, a phase delay generator 508 comprising a variable retarder, an interferometer 510 comprising a 45° linear polarizer, a wavelength demultiplexer 512, and an array of detectors 514 comprising a multielement thermoelectric ("TE") cooled, InGaAs array.

The data collection sequence in this example for the polarization monitor arrangement of FIG. 5 for a single update period is:

1) Set the polarization rotator 506 to rotate polarization axes of sample light signal by angle $\phi_1$ (for example, 0°);
2) Vary phase delay provided by variable retarder 508 (e.g., dither phase delay) through, for example,
   a. A continuous periodic retardance (phase delay) profile, such as a 0 to 1 wave sinusoidal variation, or
   b. Several discrete retardance (phase delay) steps;
3) During step 2, measure with detector array 514 interference signals of the spectrally contiguous wavelength bands provided by the wavelength demultiplexer 512 for each rotator-retarder setting;
4) Set the polarization rotator 506 to rotate polarization axes of sample light by angle $\phi_2$ (for example, 45°);
5) Repeat steps 2 and 3.

Alternatively, the polarization rotator may dither the sample light signal between two rotational orientations as the phase delay is slowly varied or stepped.

Data collection control signals for this example are schematically illustrated in FIG. 8. The polarization rotator operates with a 50% duty cycle, i.e., substantially equal time is spent at the two rotational orientations $\phi_1$ 811 and $\phi_2$ 812 as shown by the rotator control signal trace 801. At each polarization rotator position, i.e., each rotational orientation of the sample light signal, the phase is dithered with the phase delay generator to generate a plurality of phase delays between the sample light signal polarization components within the phase dither time window 831. The phase dither may be a continuous temporal variation of the phase delay or a series of phase delay steps. The phase delay may be varied though a full wave or a fraction thereof. As illustrated by the phase delay generator control signal trace 803, in this example, the phase dither comprises four phase delay steps between one full wave λ and zero during the time window 831.

With reference to FIGS. 5 and 8, during data collection, the phase-delayed sample light signal passes through an interferometer 510 and is spectrally dispersed with the wavelength demultiplexer 512 onto the detector array 514. The detector array measures the dispersed signal in wavelength channels, each channel falling on a different set of elements of the array. Accordingly, the detector array measures interference signals for all wavelength channels substantially in parallel. The detector array data acquisition trace 802 illustrates the timing of detector measurement of interference signals 821 (i.e., detector exposure) relative to polarization rotator and phase delay generator variation. The phase delay can either be held constant or ramped across each detector exposure.

The polarization state generator 517 processes the interference signals of all wavelength subbands that span the desired spectral width of the light signal. The polarization-state-generator processing trace 804 illustrates the timing of interference signal measurement processing 841 relative to other data collection operations. The polarization state generator determines the PSP properties, and based on this information, a polarization control vector is determined for the wavelength channels that span the desired spectral width of the light signal. The control vector determination trace 806 illustrates the timing of the polarization control vector determinations 861 relative to other data collection and processing operations. In this example, the polarization control vector is determined from the measured intensity of the interference signals for each wavelength channel substantially in accord with equations (7)–(12) and (13)–(19).

Based on the polarization control vector, the polarization controller driver 530 determines drive signals for the polarization controller 522 that will transfer a sufficient fraction of the light signal energy of each wavelength channel into a single PSP of the channel. The polarization controller drive trace 808 illustrates the timing of the application of the polarization controller drive signals 881 relative to other data collection and processing operations.

In a preferred embodiment, the compensation stage compensates for PMD of the light signal as follows. First, the signal is spectrally dispersed by a wavelength demultiplexer 526 with one wavelength channel passing through each channel (i.e., set of elements) of a multichannel polarization controller 522. The light in the wavelength channels is then recombined by a wavelength multiplexer 528 into a delay element comprising a single polarization-maintaining fiber 524, which has a DGD greater than the amount of DGD to be compensated for. The polarization controller 522 changes the polarization state of each channel so that the light signal polarization state matches a PSP of the transmission system plus PMD compensator combination. Preferably, the sample light signal for the polarization monitor 503 is tapped from the transmission system after the polarization controller so that feedback and diagnostic signals for the polarization controller may be determined. It is to be understood, however, that, as described above, feedback and/or iterative control of the polarization controller is not crucial to the present invention.

As illustrated in FIG. 8, the time span from the start of data collection to completion of PMD compensation, the update cycle 807, in this example, is 8 ms. The time trace 805 illustrates that approximately 3 ms of this time is spent in data collection of which approximately 2 ms of is spent generating interference signals at a plurality of phase delays and rotation orientations at a first detector exposure 851 and approximately 1 ms is spent generating interference signals at a plurality of phase delays and rotation orientations at a second detector exposure 861. Further, in one embodiment, for each detector exposure period 851, 852, at least six measurements 855, 856 are made. As illustrated, for the first detector exposure period 851 the measurements 855 are of substantially equal duration (e.g., each measurement is approximately one third of a millisecond long for a 2 ms first detector exposure period 851 and six measurements 855). Likewise, for the second detector exposure period 852 the measurements 856 are of substantially equal duration (e.g., each measurement is approximately one sixth of a millisecond long for a 1 ms second detector exposure period 852 and six measurements 856).

The time trace 805 further illustrates that approximately 2 ms of the update cycle in this example is spent processing data and/or ramping the polarization rotator and phase delay generator 853 and that approximately 3 ms is spent driving the polarization controller 522 and compensating for PMD of the light signal. In a practical application, the data collection and PMD compensation process is repeated to address changes in the degree of PMD and/or change in the PSPs of the transmission system over time. In this example, the PMD compensation cycle provided by the present invention operates with a frequency of 125 Hz.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of compensating for polarization mode dispersion of a light signal, comprising the steps of:
   providing a sample light signal;
   interfering a first polarization component and a second polarization component of the sample light signal for a plurality of phase delays between said polarization components; and
   compensating for polarization mode dispersion of a light signal based thereon by:
      determining the polarization state of the light signal using the measured intensities of the interference signals;
      determining a polarization mode dispersion vector for the light signal using the measured intensities of the interference signals; and
      using the polarization mode dispersion vector to determine a modification to the light signal that substantially compensates for polarization mode dispersion of the light signal.

2. The method of claim 1, wherein the modification to the light signal transfers a sufficient fraction of the energy of the light signal into a single principal state of polarization of the optical transmission medium.

3. The method of claim 1, wherein the step of determining the polarization state of the light signal comprises;
   associating the measured intensities of the interference signals for a first rotational orientation of the polarization components with a first sinusoidal function that is a function of phase delay;
   associating the measured intensities of the interference signals for a second rotational orientation of the polarization components with a second sinusoidal function that is a function of phase delay; and
   determining the polarization state of the light signal by solving for the electrical field strengths of orthogonal polarization components of the light signal and the phase offset between said orthogonal polarization components.

4. The method of claim 3, further comprising determining a Stokes vector for the light signal.

5. The method of claim 3, further comprising determining a Jones vector for the light signal.

6. The method of claim 1, wherein the step of interfering said polarization components comprises:
   introducing with a phase delay generator at least two phase delays between the first polarization component and the second polarization component for each of at least two rotational orientations of the polarization axes of the sample light signal with respect to an optical axis of the phase delay generator;
   providing an interference signal for each of the phase delays of each of the rotational orientations by interfering the first and second polarization components; and measuring the intensity of each of the interference signals.

7. The method of claim 6, wherein the step of compensating for polarization mode dispersion comprises compensating for polarization mode dispersion of the light signal based on the measured intensities of the interference signals.

8. The method of claim 6, wherein the step of compensating for polarization mode dispersion of the light signal comprises:
   spectrally dispersing the interference signal into spectrally contiguous subbands; and
   measuring substantially in parallel the intensity of the interference signal of two or more of the spectrally contiguous subbands.

9. The method of claim 8, wherein the step of compensating for polarization mode dispersion of the light signal comprises compensating substantially in parallel for polarization mode dispersion of two or more spectrally dispersed channels of the light signal.

10. An article of manufacture having a computer-readable medium with computer-readable instructions embodied thereon for performing the method of claim 1.

11. A method of compensating for polarization mode dispersion of a light signal, comprising the steps of:
providing a sample light signal;
introducing at least three phase delays between a first polarization component and a second polarization component of the sample light signal;
providing an interference signal for each of the phase delays by interfering the first and second polarization components;
measuring the intensity of each of the interference signals; and
compensating for polarization mode dispersion of the light signal based on the measured intensities of the interference signals by:
determining a polarization mode dispersion vector for the light signal using the measured intensities of the interference signals; and
using the polarization mode dispersion vector to determine a modification to the light signal that substantially compensates for polarization mode dispersion of the light signal.

12. The method of claim 11, wherein the modification to the light signal transfers a sufficient fraction of the energy of the light signal into a single principal state of polarization of the optical transmission medium.

13. The method of claim 11, wherein the step of determining the polarization state of the light signal comprises:
associating the measured intensities of the interference signals for a first rotational orientation of the polarization components with a first sinusoidal function that is a function of phase delay;
associating the measured intensities of the interference signals for a second rotational orientation of the polarization components with a second sinusoidal function that is a function of phase delay; and
determining the polarization state of the light signal by solving for the electrical field strengths of orthogonal polarization components of the light signal and the phase offset between said orthogonal polarization components.

14. The method of claim 13, further comprising determining a Stokes vector for the light signal.

15. The method of claim 13, further comprising determining a Jones vector for the light signal.

16. The method of claim 11, wherein the step of measuring the intensity of an interference signal comprise:
spectrally dispersing the interference signal into spectrally contiguous subbands; and
measuring substantially in parallel the intensity of the interference signal of two or more of the spectrally contiguous subbands.

17. The method of claim 16, wherein the step of compensating for polarization mode dispersion of the light signal comprises compensating substantially in parallel for polarization mode dispersion of two or more spectrally dispersed channels of the light signal.

18. An article of manufacture having a computer-readable medium with computer-readable instructions embodied thereon for performing the method of claim 11.

19. An apparatus for determining polarization mode dispersion of a light signal, comprising:
a phase delay generator positioned to receive a sample light signal comprising at least a portion of a light signal and introduce a selectable phase delay value between polarization components of the sample light signal;
an interferometer in optical communication with the phase delay generator and positioned to interfere polarization components of the sample light signal received from the phase delay generator to produce an interference signal;
a detector in optical communication with the interferometer and positioned to measure the interference signal; and
a polarization state generator that determines the polarization states of the principal states of polarization of the light signal, the relative amplitudes of the principal states of polarization of the light signal, and the differential group delay between the principal states of polarization based on a plurality of measured interference signals.

20. The apparatus of claim 19, further comprising a rotator positioned to provide for the phase delay generator at least two rotational orientations of the polarization axes of the sample light signal with respect to an optical axis of the phase delay generator.

21. The apparatus of claim 20, wherein the rotator comprises a polarization rotator adapted to rotate the polarization axes of the sample light signal.

22. The apparatus of claim 21, wherein the polarization rotator comprises a Faraday rotator.

23. The apparatus of claim 21, wherein the polarization rotator comprises a series of two or more waveplates.

24. The apparatus of claim 20, wherein the rotator comprises a phase-delay-generator rotator adapted to rotate the optical axis of the phase delay generator with respect to the polarization axes of the sample light signal.

25. The apparatus of claim 19, wherein the phase delay generator comprises a variable retarder.

26. The apparatus of claim 19, wherein the interferometer comprises a Michelson interferometer.

27. The apparatus of claim 19, wherein the interferometer comprises a 45° linear polarizer.

28. The apparatus of claim 19, further comprising a wavelength demultiplexer in optical communication with the interferometer and positioned to spectrally disperse the interference signal into spectrally contiguous subbands.

29. The apparatus of claim 18, wherein the detector comprises an array of detectors, each detector of said array positioned to measure the interference signal of one spectrally contiguous subband.

30. The apparatus of claim 19, further comprising a compensation stage in optical communication with an optical transmission medium and adapted to substantially compensate for polarization mode dispersion of a light signal in the optical transmission medium based on the polarization state of the light signal.

31. The apparatus of claim 30, wherein the compensation stage comprises:
a wavelength demultiplexer in optical communication with the optical transmission medium and positioned to spectrally disperse the light signal into spectrally dispersed channels;
a polarization controller array positioned in an optical path between the wavelength demultiplexer and a wavelength multiplexer in optical communication with the optical transmission medium,
wherein the polarization controller array is adapted to substantially compensate for polarization mode dispersion of each of the spectrally dispersed channels.

32. The apparatus of claim 31, wherein the polarization controller array comprises a plurality of liquid crystal variable retarders.

33. An apparatus for compensating for polarization mode dispersion of a light signal, comprising:
- a phase delay generator positioned to receive a sample light signal comprising at least a portion of a light signal in an optical transmission medium;
- a rotator positioned to provide at least two rotational orientations of the polarization axes of the sample light signal with respect to an optical axis of the phase delay generator;
- an interferometer positioned to interfere polarization components of the sample light signal received from the phase delay generator to produce an interference signal;
- a wavelength demultiplexer positioned to spectrally disperse the interference signal into spectrally contiguous subbands;
- an array of detectors, each detector of said array positioned to measure the interference signal of one spectrally contiguous subband;
- a polarization state generator that determines the polarization state of the light signal for each of said spectrally contiguous bands based on a plurality of measured interference signals; and
- a compensation stage in optical communication with the optical transmission medium and adapted to compensate for polarization mode dispersion of the light signal in each of said spectrally dispersed channels based on the polarization states of the spectrally contiguous subbands of said spectrally dispersed channels.

34. The apparatus of claim 33, wherein the phase delay generator comprises a plurality of liquid crystal variable retarders.

35. The apparatus of claim 33, wherein the compensation stage comprises:
- a second wavelength demultiplexer in optical communication with the optical transmission medium and positioned to spectrally disperse the light signal into spectrally dispersed channels;
- a polarization controller array positioned in an optical path between the second wavelength demultiplexer and a wavelength multiplexer in optical communication with the optical transmission medium,
- wherein the polarization controller array is adapted to substantially compensate for polarization mode dispersion in each of the spectrally dispersed channels.

36. The apparatus of claim 33, wherein the rotator comprises a polarization rotator adapted to rotate the polarization axes of the sample light signal.

37. The apparatus of claim 33, wherein the phase delay generator comprises a variable retarder.

38. The apparatus of claim 33, wherein the interferometer comprises a Michelson interferometer.

39. The apparatus of claim 33, wherein the interferometer comprises a 45° linear polarizer.

40. A method of compensating for polarization mode dispersion of a light signal in an optical transmission medium, comprising the steps of:
- providing a sample light signal comprising a portion of a light signal in an optical transmission medium;
- introducing a first phase delay between a first polarization component and a second polarization component of the sample light signal and interfering the first and second polarization components to produce a first interference signal;
- measuring the intensity of the first interference signal;
- introducing a second phase delay between the first polarization component and the second polarization component of the sample light signal and interfering the first and second polarization components to produce a second interference signal;
- measuring the intensity of the second interference signal;
- introducing a third phase delay between the first polarization component and the second polarization component of the sample light signal and interfering the first and second polarization components to produce a third interference signal;
- measuring the intensity of the third interference signal;
- providing a rotated sample light signal by rotating polarization axes of the sample light signal;
- introducing a fourth phase delay between a first polarization component and a second polarization component of the rotated sample light signal and interfering the first and second polarization components to produce a fourth interference signal;
- measuring the intensity of the fourth interference signal;
- introducing a fifth phase delay between the first polarization component and the second polarization of the rotated sample light signal and interfering the first and second polarization components to produce a fifth interference signal;
- measuring the intensity of the fifth interference signal;
- introducing a sixth phase delay between the first polarization component and the second polarization of the rotated sample light signal and interfering the first and second polarization components to produce a sixth interference signal;
- measuring the intensity of the sixth interference signal; and
- compensating for polarization mode dispersion of the light signal based on the measured intensities of the first, second, third, fourth, fifth and sixth interference signals.

41. An article of manufacture having a computer-readable medium with computer-readable instructions embodied thereon for performing the method of claim 40.

* * * * *